Figure 1:
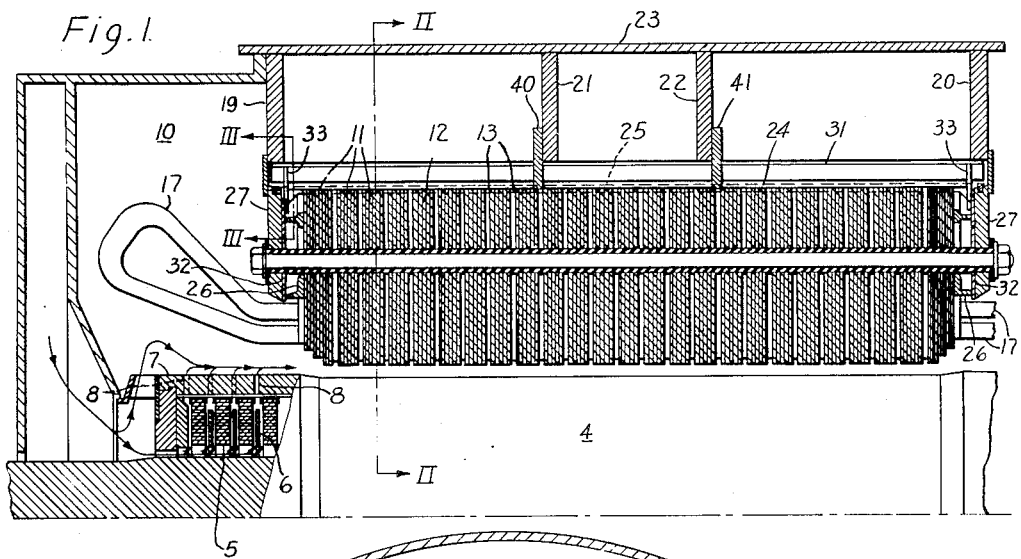

April 27, 1937.  L. A. KILGORE  2,078,668
LOW LOSS DYNAMO-ELECTRIC MACHINE
Filed Nov. 29, 1935

WITNESSES:
Michael Stark
Chas. C. Groome

INVENTOR
Lee A. Kilgore.
BY C. B. Buchanan
ATTORNEY

Patented Apr. 27, 1937

2,078,668

UNITED STATES PATENT OFFICE 2,078,668

LOW-LOSS DYNAMO-ELECTRIC MACHINE

Lee A. Kilgore, Forest Hills, Pa., assignor to Westinghouse Electric & Manufacturing Company, East Pittsburgh, Pa., a corporation of Pennsylvania Application November 29, 1935, Serial No. 52,077

9 Claims. (Cl. 171—252)

My invention relates to means for reducing the iron loss in an alternating-current dynamo electric machine, such as a polyphase generator or motor; and it further relates to means for increasing the output of a given size of machine, or for decreasing the size of the machine for a given output, by reason of my reduction in the iron losses. More specifically, my invention relates to a damper winding for limiting the flow of stray fluxes into parts where losses are incurred, thereby making it possible to design the machine for materially higher flux-concentrations in the laminated core.

Relatively little has been published on the subject of loss-reduction in alternating-current dynamo-electric machines, and particularly in regard to the stray-field iron losses therein. The conventional no-load and short-circuit loss-tests give very little indication of the distribution of the losses, since only the totals are measured. Obviously, before any significant progress can be made in the reduction of losses, it is necessary to have some information as to the distribution of the losses.

In fairly recent years, a method has been developed which makes it possible to empirically segregate the losses by so-called time-temperature tests such as are described in a paper by M. D. Ross in Electrical Engineering, published by the American Institute of Electrical Engineers in May, 1935, vol. 54, pages 512 to 515. According to the time-temperature testing method, a machine is first operated at a predetermined load for which the losses are to be investigated, for a sufficient length of time for the temperatures of all of the parts to have reached a constant value. At this time, the rate of heat-flow into each part is equal to the rate of heat-flow out of the part and into the cooling medium. Then the load is suddenly thrown off, and time-temperature curves are plotted, with the aid of small thermocouples located in various parts of the machine, and the initial slopes of these curves indicate the rate at which heat is flowing out of the parts in question, and hence they indicate the rate at which heat was previously flowing into the parts, before the load was disconnected. An application of such test-methods to turbine generators shows that a fairly large percentage of the losses occur in the solid or thick-sectioned parts of the stator frame-member.

Analytical methods for calculating these losses have recently also been devised, and I have applied such methods to the calculation of the losses in various parts of a turbo-generator. These analytical calculations have involved very laborious determinations of the flux-distribution, involving three-dimension graphical flux-mapping, to determine the fluxes travelling in the surfaces of the solid iron parts, or the fluxes cutting the electrically conducting parts. It was necessary to empirically determine certain multiplying-factors or constants applicable to various solid-iron and steel samples in order to calculate the iron losses produced by a given flux in the various solid-iron parts. It was necessary to take into consideration the demagnetizing action of induced currents, the flux-crowding in the iron parts, and the effects of stray fields and eddy currents, including the difficult-to-analyze tangential component of the end-leakage flux. In short, it was necessary to make calculations and to determine items which were by no means a part of the stock-in-trade of the ordinary machine-designer.

My study of the stray losses in the stationary parts revealed the fact that it would not be feasible to materially increase the flux-densities of the circumferential flux in the laminated stator armature-cores of turbine generators, above the limits previously existing in machines of this character, because of the rapidly increasing losses in the solid frame parts surrounding the core. These losses result from the stray fields or leakage fluxes which flow in the solid-iron parts rather than in the laminated core, and this leakage field is directly proportional to the ampere-turns necessary to drive the flux through the laminated core. As the core approaches saturation, there is obviously a relatively large increase in the ampere-turns, which enormously increases the leakage-flux losses, out of all proportion to any increase in the useful flux. However, tests on samples of the armature lamination material, at high flux-densities, have indicated that the hysteresis component of the armature-core loss increases much slower, as saturation densities are approached, than at lower densities.

Thus, if it were possible to increase the flux-density in the core, it would be possible to materially reduce the diameter of the machine without greatly effecting the hysteresis losses in the core. The back portions of the core, which are the portions which I have been discussing, with reference to the possibility of increasing the flux-densities therein, are also relatively easy to cool or to ventilate, so that it would be highly desirable to work this back portion of the core at higher flux-densities, approaching saturation, if it were not for the resultant stray-flux losses in the solid-iron parts of the stator-frame.

As a result of empirical and analytical studies such as I have briefly indicated hereinabove, I have come to the conclusion that damping-means should be provided for confining the flux to the laminated core-portion of the stator-member of a turbine generator, or similar machine, and to design the machine for much greater flux-densities than heretofore, in the back parts of the core, that is, in the parts of the core between the stator-winding and the outer periphery of the core. These damping means must be so disposed as to substantially keep the flux out of the frame-rings which surround the stator core, and out of the end-plates at the ends of the stator core.

A further feature of my invention relates to the utilization of end-plates made of magnetizable material having unusually high electrical resistance, because of considerations connected with the leakage fluxes from the stator end-connections, as will be subsequently described; and my invention also contemplates the utilization of non-magnetic finger-plates and non-magnetic sealing strips for sealing the various compartments for the inlet and outlet air or other ventilating gas.

With the object of providing a novel machine with the above-mentioned structural features and functional accomplishments, together with other objects which will be obvious as the description proceeds, my invention consists in the structural combinations and methods of design and operation hereinafter described and claimed and illustrated in the accompanying drawing, wherein—

Figure 2:
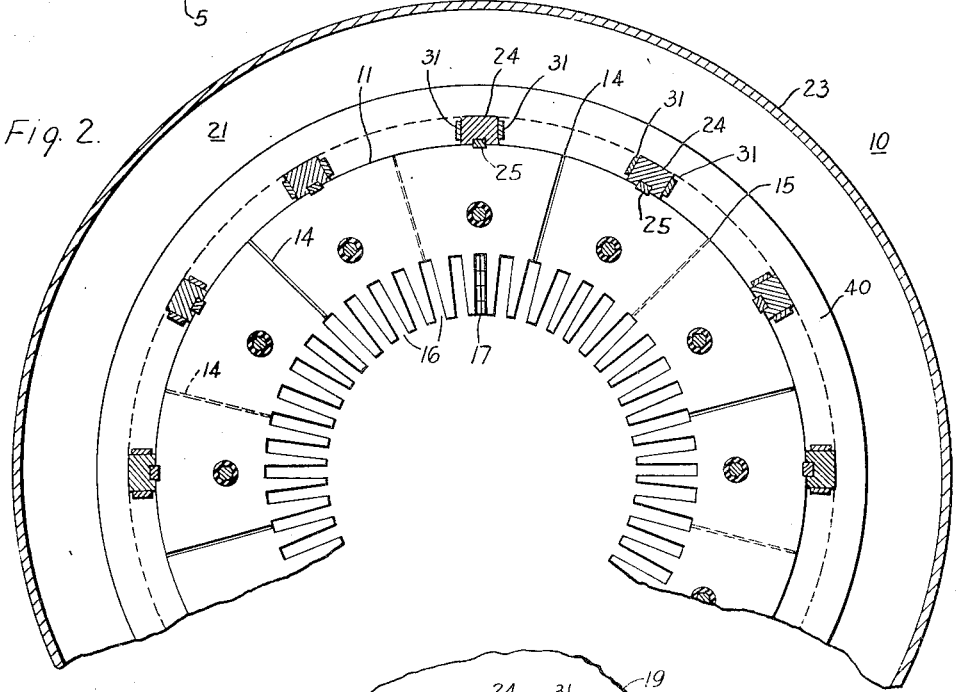
Figure 3:
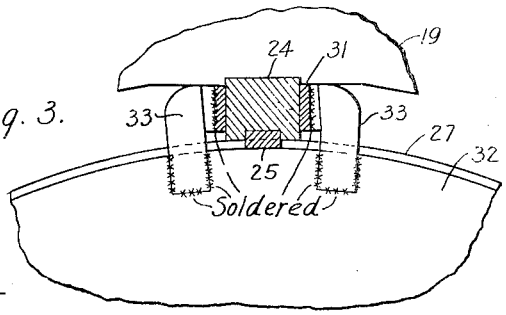

Figure 1 is a diagrammatic sectional view through the top half of a machine embodying my invention, Fig. 2 is a cross sectional view of the stator-member thereof, on the line II—II of Fig. 1, and Fig. 3 is a detailed cross sectional view on the line III—III of Fig. 1.

My invention is illustrated as being applied to a three-phase turbine generator comprising a smooth-core rotor-member 4 having direct-current exciting windings or coils, the end-connections of which are indicated at 5, the end-connections being separated by grooved insulating spacers 6, and being retained against centrifugal force by means of a steel retaining-ring 7 having rows of perforations 8 therein to provide for the flow of ventilating air past the end-connections 5, as indicated by the arrows.

The machine is also provided with a stator-member 10 comprising a stator-core 11 which is built up of packs of stator laminations or punchings 12, the various packs being separated by radial vents 13. In large machines, such as those to which my invention particularly applies, the stator-core laminations are usually made in segmental form, with radial joints between the segments, as indicated at 14 in Fig. 2, said joints being staggered, as indicated by the dotted lines 15. The stator-core 11 is of annular or ring shape, and is provided, at its inner periphery, with slots 16 (Fig. 2) for receiving the coil-sides of the polyphase armature winding 17 (Fig. 1).

The outer periphery of the annular stator core-member 11 is retained within a stator frame-member comprising two end frame-rings 19 and 20 at the two ends of the frame-member, and a plurality of axially spaced intermediate frame-rings 21 and 22, all made of magnetizable iron or steel which is solid or non-laminated or thick-sectioned. The four frame-rings 19 to 22 are joined on their outer peripheries by an outer cover 23, usually also of thick-sectioned iron, and they are joined, on their inner peripheries, by a plurality of circumferentially spaced, axially disposed frame-bars 24. The stator-core 11 is keyed to the frame-bars 24 by means of keys 25.

The stator-core punchings or laminations 12 are held in place, axially, by means of pressure-fingers or finger-plates 26, which are preferably made of substantially non-magnetizable material for reasons which will subsequently be described. The finger-plates 26 are retained in place, axially, by means of annular end-plates 27 which are usually mounted so as to lie coplanar with the end frame-rings 19 and 20, respectively. For reasons which will be subsequently more fully described, the end-plates 27 are preferably made of material (such as silicon steel) which is magnetizable, but which has a higher-than-usual electrical resistivity.

According to my invention, damping means are provided for keeping the stray fluxes of the stator-core 11 from flowing in the solid or thick-sectioned stator frame-rings 19 to 22, the outer cover 23, or the end-plates 27, and to keep said stray flux, to a large measure, also out of the frame-bars 24. Any suitable damping means may be utilized for this purpose, as I regard my invention, in its broadest aspects, as being applicable to the use of any kind of damping means for the purpose stated.

In the form of embodiment which is illustrated in the drawing, the aforesaid damping means consists of damper-straps 31 of copper or other good conductor of nonmagnetic material, said straps being disposed, one on each side of each of the frame-bars 24, the whole series of copper damper-straps 31 being short-circuited at their ends by means of a copper plate or damping-washer 32 at each end of the core, said copper washer being disposed between each end-plate 27 and its associated finger-plate 26. The connection between the damper-straps 31 and the damper-plates 32 is made by means of suitable connectors 33 which are soldered to the parts to be connected. The damping members must be sufficiently good conductors, either by virtue of their high specific conductivity, or by virtue of their generous cross-sections, so that they will not overheat when conducting sufficient induced currents to neutralize the ampere-turns which tend to send stray fluxes through the iron frame-parts which are to be protected.

While I have shown the copper straps 31 as being connected onto specially provided copper end-rings 32 interposed between the end-plates 27 and the finger-plates 26, it is obvious that these straps 31 could be connected, instead, directly to the finger-plates 26, if the latter were of sufficiently good conductivity. In like manner, if non-magnetic material of sufficiently good conductivity were utilized for the end-plates 27, these plates could be utilized as the short-circuiting rings for the copper damper-straps 31. The essential feature is that the damping means shall be of substantially non-magnetic material, so that iron losses would not be developed in the damping means itself, and of a sufficiently high electrical conductivity to carry the necessary currents without overheating. It is not necessary for the damping means to be applied in the form of straps 31, these being illustrated merely as a very convenient means which are usually sufficiently effective for the purpose.

It is obvious that the keys 25 which hold the stator punchings in place may also be made of non-magnetic material and may be connected in parallel with the damper-straps 31 to assist in keeping flux out of the frame bars 24.

A feature of my invention is the fabrication of the end-plates 27 out of a material other than the mild steel plate-material which has been in use for such parts, for a number of years, and which is still in use for the other frame-parts such as the frame-rings 19 to 22. I discovered that the armature end-turns of the stator-winding 17, that is, the portion of the winding which lies outside of the stator-core 11, sets up a fundamental flux which rotates synchronously with the rotor-member 4, and which flows across the space between the rotor-member, particularly the rotor retaining-ring 7, and the iron parts of the stator-member, particularly the end-plates 27, flowing circumferentially around each end-plate to the next pole and thence back to the retaining-ring, thus completing the circuit, and travelling around the end-plate synchronously with the rotation of the rotor-member. The stator end-plates 27 may thus be considered as magnetic shunts which prevent this end-winding flux from entering the ends of the laminated stator-core 11, which would cause high losses in the laminated iron. This being the case, it was desirable to retain the magnetic or magnetizable characteristic of these stator end-plates 27, but to reduce the losses resulting from the end-winding fluxes in these end-plates. I prefer, therefore, to make the end-plates 27 of a silicon steel which has high magnetic permeability, and at the same time a relatively high electrical resistance, thereby cutting the end-plate loss to about one-half of what it would be with mild steel material.

It will be noted, in this connection, that both the non-magnetic finger-plate 26 and the copper damping-plate 32 assist in keeping this end-winding flux out of the laminated stator-core 11. The non-magnetic finger-plate 26 operates as an air-gap separating the core-punchings from the end-plate; and the copper-plate 32 acts as a damper-plate for preventing the flow of the flux past the copper. In the same manner, the non-magnetic finger-plate 26 assists the copper damper-plate 32 in keeping the main stator flux, which flows in the core 11, out of the end-plate 27, by providing, in effect, an air-gap therebetween.

A small minor feature also introduced as a result of my studies which led up to the present invention consists in the utilization of non-magnetic material for the sealing-strips 40 and 41 which are utilized for the purpose of making an air-tight seal across the space between the outer periphery of the stator-core 11 and the inner peripheries of the intermediate frame-rings 21 and 22, respectively. Heretofore, these sealing-strips, such as 40 and 41, have been made of magnetic material which I have found to contribute somewhat to the losses, because of the stray fluxes therein, and which have also become so hot, in service, as to burn off the paint therefrom, and to be otherwise objectionable.

As has been previously intimated, the factor which tends to cause the stray fluxes to flow through the solid or non-laminated portions of the frame is the mangetomotive force or ampere-turns which are necessary to force the flux through the laminated iron of the stator-core 11. These ampere-turns are needed, not only to force the flux through the iron itself, but an appreciable ampere-turn drop occurs also at the various joints 14 and 15 between segments, when segmental punchings are utilized. These ampere-turn components become very appreciable at core-densities of the order of 90,000 lines per square inch, and become considerably larger at still higher densities.

I am referring, now, to the peak values of the flux densities in the back portions of the stator-core 11, that is, the portions between the bottoms of the slots 16 and the outer periphery of the punchings, usually considered without deduction for the slots for the keys 25, or for any other small slot or perforation in the laminated material.

Stated in another way, my invention is particularly applicable to machines in which the leakage magnetomotive force, tending to send leakage flux through the solid-iron parts of the stator frame, is at least of the order of 30 ampere-turns per linear inch, measured along the outer periphery of the stator-core 11, referring to the average magnetomotive force composed of both the saturation component and the segmental-joint component, for sending the peak-value of the flux circumferentially around the stator-core portion between the back of the winding-slots 16 and the outer periphery of the core.

The flux-densities indicated above are values which are almost never reached in modern machines such as were built prior to my invention, and which can be easily obtained, and considerably exceeded, by the use of my invention, with a resultant reduction in the size of a generator, for any given rating, or a resultant increase in the rating, for any given size of generator, because of the possibility of working the stator-punchings at a higher saturation when my damping means is utilized to keep the resulting stray fluxes out of the non-laminated parts of the stator-frame.

I claim as my invention:

1. An alternating-current dynamo-electric machine comprising a stator-member comprising an annular laminated magnetizable core-member, a thick-sectioned magnetizable frame-member surrounding said core-member, an annular thick-sectioned magnetizable end-plate at each end of the core-member, a substantially non-magnetizable finger-plate disposed between each end-plate and the core-member, an alternating-current winding carried by the core-member near the inner periphery thereof, and good-conductor, substantially non-magnetizable, damper-means disposed between the core-member and the major portion of the frame-member, and between the finger-plate and the end-plate at each end of the core-member.

2. An alternating-current dynamo-electric machine comprising a stator-member comprising an annular laminated magnetizable core-member, a thick-sectioned magnetizable frame-member surrounding said core-member, an annular thick-sectioned magnetizable end-plate at each end of the core-member, said end-plates being of steel having a higher electrical resistivity than the material of said frame-member, a substantially non-magnetizable finger-plate disposed between each end-plate and the core-member, an alternating-current winding carried by the core-member near the inner periphery thereof, and good-conductor, substantially non-magnetizable, damper-means disposed between the core-member and the major portion of the frame-member, and between the finger-plate and the end-plate at each end of the core-member.

3. An alternating-current dynamo-electric machine comprising a stator-member comprising an annular laminated magnetizable core-member, a thick-sectioned magnetizable frame-member surrounding said core-member, an annular thick-sectioned magnetizable end-plate at each end of the core-member, said end-plates being of steel having a higher electrical resistivity than ordinary mild steel, a stator-winding having end-connections extending out axially beyond said end-plates of the stator-member and a rotor-member having end-connection retaining-rings.

4. An alternating-current dynamo-electric machine comprising a stator-member comprising an annular laminated magnetizable core-member, a thick-sectioned magnetizable frame-member surrounding said core-member, an annular thick-sectioned magnetizable end-member at each end of the core-member, an alternating-current winding carried by the core-member near the inner periphery thereof, and good-conductor, substantially non-magnetizable, damper-means disposed between the core-member and the major portion of the frame-member and the end-members.

5. An alternating-current dynamo-electric machine comprising a stator-member comprising an annular laminated magnetizable core-member, a thick-sectioned magnetizable frame-member surrounding said core-member, said frame-member comprising a plurality of axially spaced ring-members and a plurality of circumferentially spaced, axially disposed, frame-bars joining the inner peripheries of said ring-members, an alternating-current winding carried by the core-member near the inner periphery thereof, and good-conductor, substantially non-magnetizable, damper-means comprising damper-straps disposed on each side of each frame-bar, and end-ring means for short-circuiting the ends of the straps at each end of the machine.

6. An alternating-current dynamo-electric machine comprising a stator-member comprising an annular laminated magnetizable core-member, said core-member comprising a plurality of axially spaced packs of laminations having radial ventilating vents therebetween, a thick-sectioned magnetizable frame-member surrounding said core-member, said frame member comprising two ring-members at the two ends of the frame-member and a plurality of axially spaced intermediate ring-members and a plurality of circumferentially spaced, axially disposed, frame-bars joining the inner peripheries of said ring-members, a plurality of substantially non-magnetizable annular sealing-strips disposed between said core-member and said intermediate ring-members, respectively, an alternating-current winding carried by the core-member near the inner periphery thereof, and good-conductor, substantially non-magetizable, damper-means for substantially excluding the core-member flux from said frame-member.

7. An alternating-current dynamo-electric machine comprising a stator-member comprising an annular laminated magnetizable core-member, a thick-sectioned magnetizable frame-member surrounding said core-member, an annular thick-sectioned magnetizable end-plate at each end of the core-member, a substantially non-magnetizable finger-plate disposed between each end-plate and the core-member, an alternating-current winding carried by the core-member near the inner periphery thereof, the rated ampere-turns of said winding, and the radial depth of said core-member back of said winding being such that the peak-value of the circumferential magnetic flux in the back part of said core-member is at least of the order of 90,000 lines per square inch, and good-conductor, substantially non-magnetizable, damper-means for substantially excluding the core-member flux from said frame-member and from said end-plates.

8. An alternating-current dynamo-electric machine comprising a stator-member comprising an annular laminated magnetizable core-member, a thick-sectioned magnetizable frame-member surrounding said core-member, an alternating-current winding carried by the core-member near the inner periphery thereof, the rated ampere-turns of said winding, and the magnetic reluctance and the radial depth of said core-member back of said winding being such that the peak-value of the ampere-turns per inch of the outer periphery of the core-member, necessary to drive the magnetic flux circumferentially in the back part of said core-member, is at least 30 ampere-turns per inch, averaged around the periphery of said core-member, and good-conductor, substantially non-magnetizable, damper-means for substantially excluding the core-member flux from said frame-member.

9. An electrical machine comprising an annular laminated magnetizable core-member, a thick-sectioned magnetizable supporting member disposed near one periphery of said core-member, an alternating-current winding carried by the core-member near the other periphery thereof, the rated ampere-turns of said winding, and the magnetic reluctance and the radial depth of said core-member between said winding and said first-mentioned periphery being such that the average ampere-turns per inch, at said first-mentioned periphery, required to drive the peak magnetic flux circumferentially around the core-member, are at least of the order of 30, and good-conductor, substantially non-magnetizable, damper-means for substantially excluding the core-member flux from said supporting member.

LEE A. KILGORE.